US012621539B2

(12) United States Patent
Adsule

(10) Patent No.: US 12,621,539 B2
(45) Date of Patent: May 5, 2026

(54) MACHINE LEARNING-BASED CUSTOM CONTENT GENERATION FOR VIDEO STREAMING CONTENT SYSTEMS AND APPLICATIONS

(71) Applicant: T-MOBILE INNOVATIONS LLC, Overland Park, KS (US)

(72) Inventor: Dharmendra Adsule, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 79 days.

(21) Appl. No.: 18/740,227

(22) Filed: Jun. 11, 2024

(65) Prior Publication Data

US 2025/0380034 A1 Dec. 11, 2025

(51) Int. Cl.
*H04N 21/80* (2011.01)
*H04L 67/306* (2022.01)

(52) U.S. Cl.
CPC .......... *H04N 21/80* (2013.01); *H04L 67/306* (2013.01)

(58) Field of Classification Search
CPC ......... H04N 21/23418; H04N 21/2668; H04N 21/812; H04N 21/8549; H04N 21/251; H04N 21/44008
See application file for complete search history.

(56) References Cited

U.S. PATENT DOCUMENTS

| | | | |
|---|---|---|---|
| 2002/0108109 A1* | 8/2002 | Harris ................ | H04N 21/6581 725/91 |
| 2022/0232273 A1* | 7/2022 | Ernest .................... | G06Q 40/12 |
| 2024/0292070 A1* | 8/2024 | Li ......................... | H04N 21/816 |
| 2025/0133273 A1* | 4/2025 | Infante ................... | G06F 40/40 |
| 2025/0211816 A1* | 6/2025 | K ...................... | H04N 21/44008 |
| 2025/0267315 A1* | 8/2025 | Maalej ................. | H04N 21/812 |

(Continued)

OTHER PUBLICATIONS

"What Is a CDP? A Complete Guide for Customer Data Platforms", Available online at: <https://cdp.com/basics/what-is-a-customer-data-platform-cdp/>, Retrieved on Apr. 27, 2024, 10 pages.

(Continued)

*Primary Examiner* — Jason Salce

(74) *Attorney, Agent, or Firm* — Shook, Hardy & Bacon L.L.P.

(57) ABSTRACT

In various embodiments, machine learning-based custom content generation for video streaming content systems and applications is provided. One or more of the embodiments described herein, among other things, provide for a machine learning/generative artificial intelligence (GAI)-based custom video generator model that may be used to synthesize targeted video streaming content (e.g., in real-time), based at least in part on user profile data from a user profile associated with a target user, and content data comprising an indication of one or more video content objectives directed at the target user. In some embodiments, a custom video content generator as disclosed herein may produce one or more prompts based on a set of content data and the user profile data, and apply the prompts to the video generator model to generate targeted video data that may be streamed to user equipment for presentation to the target user.

17 Claims, 7 Drawing Sheets

500

(56) References Cited

U.S. PATENT DOCUMENTS

2025/0310585 A1* 10/2025 Rangan ............... G06V 10/82
2025/0317632 A1* 10/2025 Galynsky ......... H04N 21/47205

OTHER PUBLICATIONS

Balaji et al., "Conditional GAN with Discriminative Filter Generation for Text-to-Video Synthesis", Proceedings of the Twenty-Eighth International Joint Conference on Artificial Intelligence (IJCAI-19), Aug. 2019, pp. 1995-2001.

Feuerriegel et al., "Generative AI", Business & Information Systems Engineering, vol. 66, No. 1, Feb. 2024, pp. 111-126.

Gill, J. K., "The Complete Guide to Generative AI Architecture", Available online at: <https://www.xenonstack.com/blog/generative-ai-architecture>, Nov. 21, 2023, 23 pages.

Girdhar et al., "EMU VIDEO: Factorizing Text-to-Video Generation by Explicit Image Conditioning", Available online at: <https://arxiv.org/pdf/2311.10709>, Nov. 17, 2023, 29 pages.

Joubert et al., "Processing Scene Context: Fast Categorization and Object Interference", Vision Research, vol. 47, No. 26, Dec. 2007, pp. 3286-3297.

Mahmud et al., "Context Inference Engine (CIE): Inferring Context", International Journal of Advanced Pervasive and Ubiquitous Computing, vol. 4, No. 4, 2012, 18 pages.

OpenAI, "Creating Video from Text", Available online at: <https://openai.com/sora>, Retrieved on Mar. 1, 2024, 14 pages.

Ortiz, S., "Adobe's New Generative AI Tool is a Game-Changer for Video Editing", Available online at: <https://www.zdnet.com/article/adobes-new-generative-ai-tool-is-a-game-changer-for-video-editing/>, Oct. 13, 2023, 9 pages.

Qualtrics, "Customer Data Platforms: Everything You Need to Know", Available online at: <https://www.qualtrics.com/au/experience-management/customer/customer-data-platform/>, Retrieved on Apr. 27, 2024, 10 pages.

Qualtrics, "How to build and use customer profiles", Available online at: <https://www.qualtrics.com/au/experience-management/customer/customer-profile/>, Retrieved on Apr. 27, 2024, 10 pages.

Rask AI, "Leading Ai Video Localization & Dubbing Tool", Available online at: <https://www.rask.ai/>, Retrieved on Mar. 1, 2024, 7 pages.

Sakirin et al., "A Survey of Generative Artificial Intelligence Techniques", Babylonian Journal of Artificial Intelligence, vol. (2023), Mar. 10, 2023, pp. 10-14.

Sheynin et al., "Emu Edit: Precise Image Editing via Recognition and Generation Tasks", Available online at: <https://arxiv.org/pdf/2311.10089>, Nov. 16, 2023, 23 pages.

* cited by examiner

500

GENERATE ONE OR MORE CONTENT GENERATION PROMPTS FOR INPUT TO A VIDEO GENERATOR MODEL BASED AT LEAST ON ONE OR MORE VIDEO CONTENT OBJECTIVES AND USER PROFILE DATA, WHEREIN THE USER PROFILE DATA REPRESENTS ONE OR MORE CHARACTERISTICS OF A USER DEFINING A TARGET OF THE ONE OR MORE VIDEO CONTENT OBJECTIVES
B510

GENERATE TARGETED VIDEO DATA BASED ON APPLYING THE ONE OR MORE CONTENT GENERATION PROMPTS TO A VIDEO GENERATOR MODEL
B512

TRANSMIT THE TARGETED VIDEO DATA TO A USER EQUIPMENT CLIENT APPLICATION TO CAUSE THE USER EQUIPMENT CLIENT APPLICATION TO PRESENT VIDEO CONTENT BASED ON THE TARGETED VIDEO DATA
B514

MACHINE LEARNING-BASED CUSTOM CONTENT GENERATION FOR VIDEO STREAMING CONTENT SYSTEMS AND APPLICATIONS

BACKGROUND

Targeted internet advertising, also known as online behavioral advertising, is a method used by advertisers to show advertisements that are more likely to be relevant to a user that views the advertisements. This is based on information about a user's behavior online, such as the websites visited by a user, the applications used by a user, and the searches and/or purchases performed by a user. Targeted advertising offers several benefits, both for the advertisers and the consumers. By focusing on a specific audience, advertisers can optimize their use of computing and network resources by reaching the people who are most likely to be interested in their products or services.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In contrast with presently available technologies, one or more of the embodiments described herein, among other things, provide for a machine learning/generative artificial intelligence (GAI)-based custom video generator model that may be used to synthesize targeted video streaming content (e.g., in real-time), based at least in part on user profile data from a user profile associated with a target user and content data comprising an indication of one or more video content objectives directed at the target user. In some embodiments, a custom video content generator as disclosed herein may produce one or more prompts based on a set of content data, and the user profile data, and apply the prompts to the video generator model to generate targeted video data that may be streamed to user equipment for presentation to the target user.

BRIEF DESCRIPTION OF THE DRAWINGS

Aspects of the present disclosure are described in detail herein with reference to the attached Figures, which are intended to be exemplary and non-limiting, wherein:

FIG. 5 is a flow chart illustrating an example method for machine learning-based custom content generation, in accordance with some embodiments described herein;

DETAILED DESCRIPTION

Figure 1:
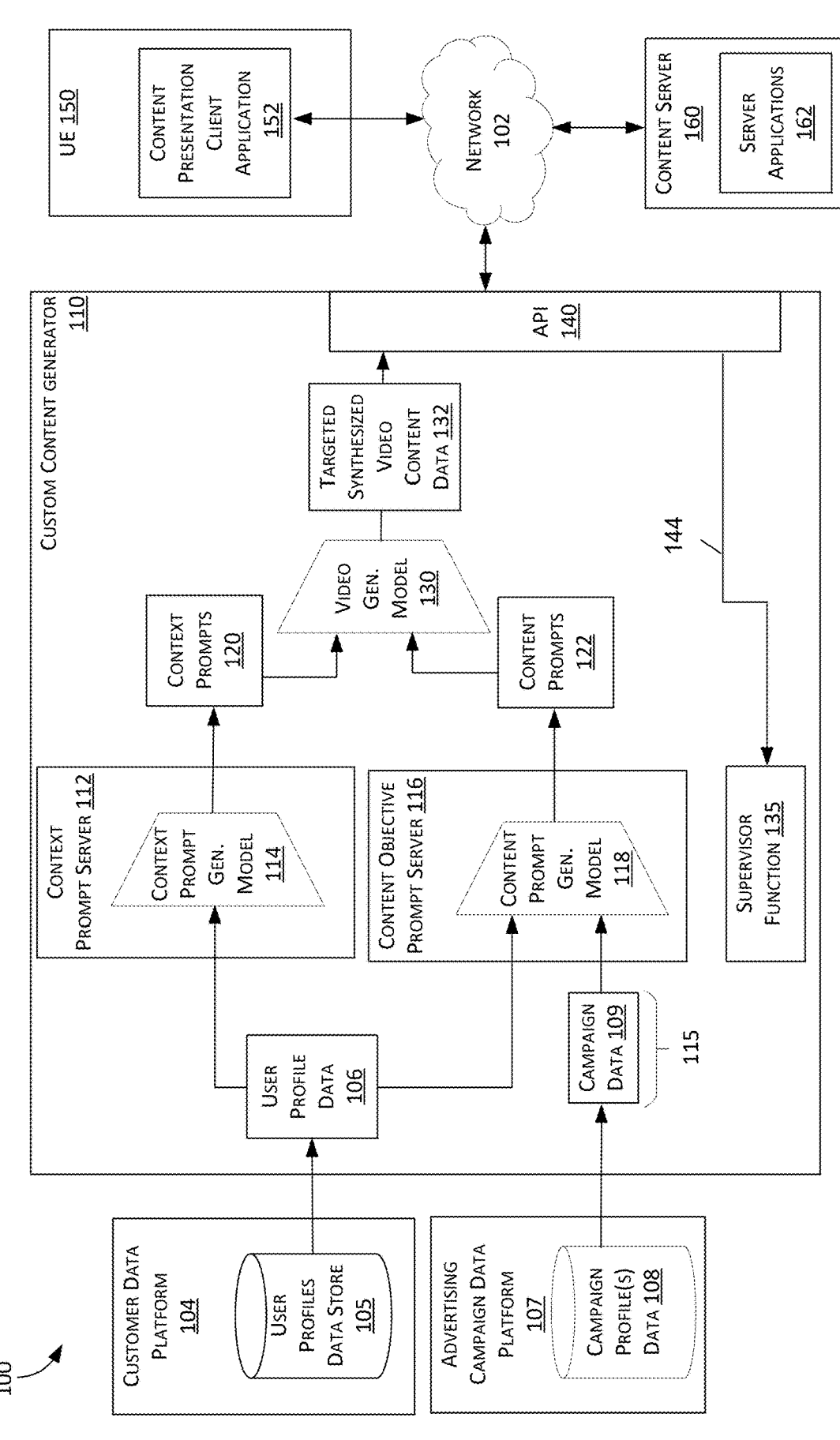
FIG. 1 is a diagram illustrating an example machine learning-based custom content generator system, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

Advertisements delivered based on online behavioral advertising are more likely to be relevant to a consumer's interests, which can lead to higher engagement rates. Consumers see advertisements that are more relevant to their interests, which can make their online experience more personalized and less cluttered with irrelevant advertisements. Targeted ads can help consumers discover new products or services that they might be interested in but weren't actively searching for. If consumers are in the market for a particular product or service, targeted ads can save them time by bringing relevant offers to their attention. When a consumer engages in online activities (e.g., browses the Internet, interacts with social media, purchases items and/or browses catalogs of online retailers, views newsfeeds, watches and/or listens to streaming content such as movies and/or podcasts, etc.) data about those online activities is collected through various means such as cookies, pixels, and device identifiers (device IDs). This data may then be collected and aggregated, for example, by a consumer data platform (CDP), to build a user profile associated with the individual user. In addition to online interactions, a user profile can include demographic information (e.g., age, gender, and/or race), socio-economic information, level of education, political affiliations, geographic location, interests, online behavior, and/or other data. Often a profile is linked to an individual user based on non-personally identifiable information, such as device IDs, or other identifiers. In some embodiments, user profile data may be collected by the custom from a plurality of different resources, rather than, or in addition to, a platform such as a CDP.

Once an advertisement is associated with a targeted user, the advertisement content may be delivered through various channels. For example, the advertisement content could be displayed on a website visited by the user on advertising-supported applications, played as a short advertisement before other requested content, or even delivered as email messages. Moreover, the user profile may be further updated based on a user's interaction—or lack of interaction—with the delivered advertisement.

However, these systems have a problem in that while online behavioral advertising technologies today can be used to match a product and/or service with a user that may be a likely consumer of that product and/or service, the advertising content itself is canned or generic—designed for mass-marketing to a wide audience—and may or may not effectively deliver the advertiser's pitch to a user that may otherwise have some potential interest in the underlying product and/or service, but does not engage in the delivered advertising content because they are put off or otherwise simply not engaged by the delivered advertising content.

Moreover, the problems with these traditional systems are not just limited to lost opportunity costs for the advertiser, but also are manifested with respect to the underlying computing systems, networks, and technologies that are used to deliver this content. For example, large amounts of data are collected and stored for a user, consuming bandwidth, memory, and processing resources of both the user and the CDP. Likewise, bandwidth, memory, and processing resources of servers and network resources are used for storing, matching, and delivering advertising content. Because there is a substantial likelihood that the delivered content may ultimately be disregarded by the end user, and because of the scale at which online behavioral advertising technologies are currently in use, there are substantial inefficiencies present with respect to utilization of processing resources by current online behavioral advertising technologies that on the physical layer result in greater unnecessary consumption of energy, greater unnecessary generation of heat by processors, greater unnecessary consumption of processing cycles that could be used for other processes, and greater unnecessary consumption of memory resulting in servers having to maintain larger data storage resources.

In contrast with presently available technologies, one or more of the embodiments described herein, among other things, provide for a machine learning/generative artificial intelligence (GAI)-based custom video content generator that may be used to synthesize targeted video streaming content (e.g., in real-time), based at least in part on user profile data from a user profile associated with a target user and content data comprising an indication of one or more video content objectives directed at the target user. Embodiments described herein are not limited to advertising use cases, but may include other use cases, such as delivering synthetically generated user-requested content to a user.

In some embodiments, content data may comprise, for example data representing an advertising campaign (e.g., campaign data). For example, campaign data may be received from an advertising campaign platform that serves campaign data based on one or more campaign profiles. That is, each campaign profile may define products, services, data characterizing the provider products/services, branding information (e.g., logos, trade dress, slogans, etc.), characteristics of target consumers, a campaign theme describing points of the advertising pitch, a marketing strategy, a cast of characters appearing in the content, any time-limited information (e.g., time-limited sales, events, and/or specials), a general plot, mood, emotional tone, and/or theme of scenes and/or actions involved in the advertising pitch and/or other data that may indicate the objectives of presenting the video content to a target user. In some embodiments, campaign data may define the video content objectives in a user-agnostic way, that is, with a focus on characterizing the subject/goal of the advertising rather than any specific consumer—with the idea that the user profile data provides at least part of the relevant information that may be used to match a particular campaign profile with a target user.

In some embodiments, user profile data may be requested and/or received by the custom video content generator from a network server, such as a consumer data platform (CDP), which may also be referred to as a customer data platform and/or a customer experience platform. A CDP may comprise a network system of servers and databases that collect and structure data about individual users of online services from various sources to create comprehensive user profiles that may be used for online behavioral advertising, personalized marketing campaigns, or to otherwise analyze user behaviors and demographics for other purposes. User profile data may comprise an amalgamation of user interactions with one or more websites (pages visited, items clicked, time spent on a page, etc.); user interactions within a mobile application, such as app usage, features used, and in-app purchases; data from relationship management systems, which include customer contact details, purchase history, and customer service interactions; interactions on social media platforms, such as likes, shares, comments, and direct messages; purchase data and other transactional information; information submitted through web forms, such as sign-up forms and contact forms; data from email interactions, such as click-through rates and responses; and/or data purchased from third-party sources. User profile data may thus include one or more of, but is not limited to, demographic information (e.g., age, gender, and/or race), socioeconomic information, level of education, political affiliations, geographic location, interests, online behavior, and/or other data.

In some embodiments, a custom video content generator as disclosed herein may receive an input (e.g., one or more prompts) based on a set of content data comprising an indication of one or more video content objectives and user profile data representing one or more characteristics of a user defining a target of the one or more video content objectives, and apply the data to a video generator model, (e.g., a machine learning/generative artificial intelligence (GAI)-based custom video content generator) to generate targeted video data that may be streamed to the user equipment (UE) for presentation to the target user.

The custom content generator thus learns information such as the personal preferences of a user based on user profile data—which may be gathered from one or more difference sources—to synthetically generate and serve content in real-time that is more personally tailored to spark the interest of the user. The custom content generator thus shifts focus from merely delivering content about a product or service the user may be interested in to delivering content that itself may pique interest of the user because it is delivered within a context having a degree of familiarity and/or alignment with their personal preferences as inferred from the user profile data. The computing resources used to produce and deliver the video content to the user are thus more efficiently utilized because the content delivered is more likely to be engaged with by the target user rather than disregarded-thereby reducing the amount of network traffic unproductively consuming limited bandwidth resources.

In some embodiments, a custom content generator may include one or more prompt servers that generate prompts for input to the video generator model to generate the targeted video content data. For example, in some embodiments, the custom content generator may include a content objective prompt server that generates a set of content prompts in response to user profile data for a target user and content data (e.g., campaign data and/or content request data). In some embodiments, the custom content generator may include a content objective prompt server that generates a set of content prompts in response to user profile data for a target user and content data (e.g., campaign data and/or content request data). The custom content generator may include a user context prompt server that generates a set of context prompts that may be used to place the content objectives of the content prompts within a context having a more direct affinity to the target user.

For example, in some embodiments, the custom content generator may receive a content request message requesting targeted video content for a user. The content request message may be generated by an application on the user's UE and/or by a server application on a content server that the UE is using. In some embodiments, the content request message may be received via a network connection through an application programming interface (API) and/or may include a target identifier (target ID) that may be used by the custom content generator to retrieve user profile data for that user (e.g., from a CDP).

In some embodiments, based on the user profile data, the custom content generator (e.g., the content objective prompt server) may receive content data in the form of campaign data from an advertising campaign data platform. In some embodiments, the custom content generator may provide the user profile data to the advertising campaign data platform, which may then match the user (and/or the target ID) with a campaign profile based on the user profile data. That is, the custom content generator may send a request or query to a network server hosting the advertising campaign data platform and in response receive a campaign profile based at least in part on the user profile data. For example, where the user profile data indicates that the target user has been browsing internet resources regarding a type of product or service, the advertising campaign data platform may provide to the custom content generator a set of campaign data associated with that product or service that defines one or more video content objectives for the targeted video content data that is to be produced by the custom content generator. The campaign data may define products, services, data characterizing the provider products/services, branding information (e.g., logos, trade dress, slogans, etc.), a campaign theme describing points of the advertising pitch, a marketing strategy, a cast of characters appearing in the content, any time-limited information (e.g., time-limited sales, events, and/or specials), a general plot, mood, emotional tone, and/or theme of scenes and/or actions involved in the advertising pitch and/or other data that indicates the objectives of presenting the video content to a target user. Based on the content data, the content objective prompt server may generate a set of prompts to provide as input to the video generator model to generate targeted video content data directed at achieving the objectives defined by the content data. In some embodiments, the content objective prompt server may further produce content prompts based on integrating user profile data with the content data. For example, based on the user profile data, the content objective prompt server may generate content prompts that focus on features, aspects, and/or benefits that it infers are of greater interest to the target user than others. For example, if the content objective prompt server infers from the user profile data that the user enjoys travel, then the content objective prompt server may generate content prompts that emphasize size and/or portability features. In some embodiments, the content objective prompt server may comprise one or more machine learning models that implement a content prompt generator model. In some embodiments, the content prompt generator model may comprise a natural language processor (NLP)—such as a large language model (LLM)-based machine learning model—that is trained to generate prompts based on a natural language input received from the content data. For example, the content prompt generator model may predict or infer a selection of one or more prompts to feed the video generator model to produce targeted video content data directed at achieving the objectives defined by the content data. In some embodiments, the content prompts may be in the form of human-readable data and/or may comprise prompts in the form of embeddings, vectors, or otherwise encoded prompts understandable to the video generator model.

As mentioned above, the custom content generator may include a user context prompt server that generates a set of context prompts that may be used to place the content objectives of the content prompts within a context having a more direct affinity to the target user. For example, the user context prompt server may receive the user profile data as an input, and from that generate a set of context prompts that are used as input to the video generator model. For example, the user context prompt server may generate prompts that adjust one or more aspects of the content based on the demographic, education level, family considerations, socio-economic data, cultural heritage, scenery, environment, residence location, hobbies, interests, and/or other factors that may be used to present the content to the target user in a way that will stimulate an increased level of interest. For example, context prompts may be generated to adjust the appearance, accents, behaviors, and/or mannerisms of characters appearing in the content, or present the content in a context of a cultural heritage, scenery, environment, location, hobby, activity, or interest associated with the target user by the user profile data. In some embodiments, context prompts may be used to localize the contents to a locality of the user. For example, for a target user located in the Seattle, Washington area, the user context prompt server may generate a prompt to place an image of Mount Rainer, Puget Sound, and/or Pike Place Market in the background. As another example, if the content objectives include displaying an establishment's storefront, then the user context prompt server may generate a prompt that accurately incorporates presentation of a local establishment's storefront based on indications of location from the user profile data, or use imagery from the user's own neighborhood. Other context prompts may adjust the content for other context based on the user profile data such as, but not limited to, different time periods, different cultural and/or social norms and/or historical events, styles, scenery, architecture, technology, languages, dialects, music, cultural references, and/or other sets of characteristics that define circumstances and/or features that form the setting for events, scenes, dialogue, actions, and other plot devices appearing in the video content. Moreover, localization may be correlated with real-time information about local news and events that is incorporated into the targeted video content—for example, generating scenes reflecting current weather conditions in the vicinity of the user.

In some embodiments, the user context prompt server may comprise one or more machine learning models that implement a context prompt generator model. In some embodiments, the context prompt generator model may comprise a natural language processor (NLP)—such as a large language model (LLM)-based machine learning model—that is trained to generate prompts based on a natural language input received from the user profile data. For example, the context prompt generator model may predict or infer a selection of one or more prompts to feed the video generator model to produce targeted video content data within a context predicted and/or inferred to have a high level of affinity based on the user profile data. In some embodiments, the context prompts may be in the form of human-readable data and/or may comprise prompts in the form of embeddings, vectors, or otherwise encoded prompts understandable to the video generator model. In some embodiments, the content prompt generator model and the context prompt generator model may be integrated together in a machine learning model that receives the user profile data and content data as inputs and produces a set of prompts to the video generator model that includes a set of prompts representing both context prompts and content prompts.

In some embodiments, the content and context prompts may be used as inputs to a generative artificial intelligence (AI) video generator model that outputs synthesized targeted video content data that comprises video content directed at the objectives indicated by the content data, within a context adjusted to have high affinity to the target user. As such, improvements and efficiencies are realized with respect to the underlying computing and network resources that implement the custom video content generator in terms of memory, in that more precisely targeted video content can be delivered without having to produce and maintain in memory various different versions of content, and the computing resources to deliver the content are more efficiently utilized as the content delivered is more likely to be noticed and consumed by the user.

As previously mentioned, embodiments described herein are not limited to advertising use cases, but may include other use cases, such as delivering synthetically generated user-requested content to a user. For example, in some embodiments, a user may transmit a content request to the custom content generator. In such an embodiment, targeted video content may be generated using context prompts produced from user profile data, and using content data that comprises content request data derived from the user's content request. In a marketing use case, the user's content request may be a request for further information about a product the user is viewing from an online catalog, such as a request for features and/or specifications for the products, or installation/assembly instructions.

In other use cases, the content request may comprise a request for video content for entertainment purposes and may specify details such as plot elements, story lines, characters, scenes, and so forth, such that the video generator model synthesizes targeted video content data based on a prompt derived from the user content request. As described herein, the video generator model may further synthesize the content based on context prompts derived from user profile data from the user submitting the content request, increasing the likelihood that the user will experience a high degree of affinity for the targeted video content synthesized by the custom content generator in response to their content request. As such, a user may request delivery of video for entertainment purposes with the content request data indicating that the content should be a present day adventure/ mystery story that stars Roger Moore and Ingrid Bergman, and the custom content generator can self-generate one or more context prompts based on the user profile data to augment the content data provided by the user—in a manner likely to be appealing to the user. The video generator model may be trained, for example, on annotated historic film, movies, and/or television content, and learn characteristics of actors and film plots of different genres to generate temporally coherent frames of photorealistic video and accompanying audio given a relatively sparse content request from the user.

FIG. 1 is a diagram illustrating a data flow diagram for an example machine learning-based custom content generator system 100 in accordance with embodiments of this disclosure. In FIG. 1, a user may operate user equipment 150 to execute a content presentation client application 152 (e.g., a general-purpose web browser or other client application and/or software) for accessing network (e.g., Internet) resources via a network 102. Network resources accessed by the UE 150 may include, for example, one or more server applications 162 hosted by one or more content servers 160 (e.g., a website server or streaming content server). UE 150 may include computing devices such as, but not limited to, handheld personal computing devices, cellular phones, smart phones, tablets, laptops, smart televisions, content streaming devices, and similar consumer equipment, or stationary desktop computing devices, workstations, servers, and/or network infrastructure equipment. As such, the UE 150 may include both mobile UE and stationary UE. A UE 150 can include one or more processors and one or more non-transient computer-readable media for executing code to carry out the functions of the UE 150 described herein. In some embodiments, the UE 150 may be implemented using a computing device 600, as discussed below with respect to FIG. 6. One or more applications may be executed by processors of the UE 150, such as content presentation client application 152. In some embodiments, the content presentation client application 152 may comprise a general-purpose web browser. In some embodiments, the content presentation client application 152 may comprise a client application specifically for receiving video streaming content from a content server 160.

As shown in FIG. 1, machine learning-based custom content generator system 100 may include a custom content generator 110 that generates synthesized targeted video content for delivery to a target user of UE 150 via network 102. In some embodiments, the custom content generator 110 may be implemented at least in part using a computing device 600, as discussed below with respect to FIG. 6. In some embodiments, the custom content generator 110 may be implemented at least in part using a cloud computing environment 710, as discussed below with respect to FIG. 7. For example, the custom content generator 110 may be implemented by one or more processors of a network server or other network-connected computing resource that hosts the custom content generator 110. The function of the custom content generator 110 described herein may be performed by one or more processors that execute computer-usable instructions stored on one or more computer-readable media.

In some embodiments, the content presentation client application 152 may initiate a session with one or more of the server applications 162. As part of accessing those services, the service application(s) 162 may use the content presentation client application 152 to present marketing and/or promotional streaming video content material (e.g., online behavioral advertising), which may be more generally referred to herein as targeted video content. In some embodiments, the service application(s) 162 may access the custom content generator 110 by sending a content request 144 to an application programming interface (API) 140 of the custom content generator 110. As shown in FIG. 1, the content request 144 may be received by a supervisory function 135 of the custom content generator 110 that extracts a target ID linked to the user of UE 150. For example, the target ID may be based on tracking cookies, pixels, device IDs, and/or other non-personally identifiable information, or other identifiers.

In some embodiments, based on the target ID, the supervisory function 135 may request user profile data 106 (associated with the user of UE 150) from one or more network server-based sources such as, but not limited to, a consumer data platform (CDP) 104. For example, the supervisory function 135 may send a request or query to one or more of such network servers. CDP 104 may comprise, for example, a network system of servers and databases that collect and structure data about the user of UE 150 and other individual users of online services from various sources to create a comprehensive user profiles data store 105 of user profiles that may be used for online behavioral advertising, personalized marketing campaigns, or to otherwise analyze user behaviors and demographics for other purposes.

Based on the user profile data 106, the custom content generator 110 may communicate with an advertising campaign data platform 107 to request content data 115. In this use case, the content data 115 may comprise campaign data 109.

In some embodiments, the supervisory function 135 may provide one or more elements of the user profile data to the advertising campaign data platform 107. The advertising campaign data platform 107 may comprise a set of campaign profiles 108, where each campaign profile represents a comprehensive set of campaign data 109 associated with a distinct marketing/advertising campaign. Each of the campaign profiles 108 may define products, services, data characterizing the provider products/services, branding information (e.g., logos, trade dress, slogans, etc.), characteristics of target consumers, a campaign theme describing points of the advertising pitch, a marketing strategy, a cast of characters appearing in the content, any time-limited information (e.g., time-limited sales, events, and/or specials), a general plot, mood, emotional tone, and/or theme of scenes and/or actions involved in the advertising pitch, and/or other data that may indicate the objectives of presenting the video content to a target user.

In some embodiments, the advertising campaign data platform 107 and/or other elements of the custom content generator 110 (e.g., the supervisory function 135) may match the user (and/or the target ID) with a campaign profile 108 based on the user profile data, and in response obtain content data 115 comprising campaign data 109.

As shown in FIG. 1, in some embodiments, the custom content generator 110 uses the user profile data 106 and content data 115 to generate a set of one or more content generation prompts to use as input to a video generator model 130 to synthesize targeted video content data 132. For example, in some embodiments, the custom content generator 110 may include a content objective prompt server 116 that generates a set of content prompts 122 and a user context prompt server 112 that generates a set of one or more context prompts 120. The set of content prompts 112 and the set of context prompts 120 define the set of one or more content generation prompts that can be applied to the video generator model 130.

The video generator model 130 may comprise generative artificial intelligence (GAI)-based machine learning models implemented using a deep neural network (DNN), a Generative Adversarial Network (GAN), a variational autoencoder (VAE), and/or other GAI machine learning model architecture. The video generator model 130 may be trained on annotated video to generate temporally coherent frames of photorealistic video and corresponding audio. In some embodiments, the video generator model 130 may be trained using video content (which may include video and audio data channels), and/or segments thereof, annotated with contextual indicators (e.g., to train the video generator model 130 on features and content elements that characterize a particular context). The resulting targeted video content data 132 may be delivered back to the UE 150 for presentation by the content presentation client application 152.

The content objective prompt server 116 may receive as input the content data 115 and/or the user profile data 106, and in response generate the set of one or more content prompts 122 that represent one or more video content objectives for the targeted video content data 132. In some embodiments, based on the content data 115, the content objective prompt server 116 may generate the set of content prompts 112 to provide as input to the video generator model 130 to generate targeted video content data 132 directed at achieving the objectives defined by the content data 115. In some embodiments, the content objective prompt server 116 may further produce content prompts 122 based on integrating user profile data 106 with the content data 115. For example, based on the user profile data 106, the content objective prompt server 116 may generate content prompts 122 that focus on features, aspects, and/or benefits of products and/or services that it infers are of particular interest to the target user. In some embodiments, the content objective prompt server 116 may comprise one or more machine learning models that implement a content prompt generator model 118. The content prompt generator model 118, for example, may comprise a natural language processor (NLP) (such as a large language model (LLM)-based machine learning model) that is trained to generate the content prompts 112, for example based on a natural language input received from the content data 115. For example, the content prompt generator model 118 may predict or infer a selection of one or more content prompts 122 for input to the video generator model 130 that the content prompt generator model 118 predicts will produce targeted video content data 132 that is directed at achieving the objectives defined by the content data 115 (e.g., campaign data 109). In some embodiments, the content prompts 122 may be in the form of human-readable data and/or may comprise prompts in the form of embeddings, vectors, or otherwise encoded prompts understandable to the video generator model 130.

As shown in FIG. 1, the custom content generator 110 may also include a user context prompt server 112 that generates a set of context prompts 120 that may be used to place the content objectives of the content prompts 122 within a context having a more direct affinity to the target user. Context prompts 122 may be used to define a set of features that form a setting for at least one of events, scenes, dialogue, action, or plot devices associated with the video content data generated by the video generator model 130. As a non-limiting example, content prompts 122 may represent prompts intended to cause the video generator model 130 to use content elements associated with at least one of a specific time period, set of cultural norms, set of societal norms, historical event, styles, objects, scenery, architecture, technology, location, character, actor, language, dialect, music, phrases, animals, or cultural reference associated with a particular context.

The user context prompt server 112 may receive the user profile data 106 as an input to generate a set of context prompts 120 that are used as input to the video generator model 130. For example, the user context prompt server 112 may generate prompts 120 that adjust one or more aspects of the targeted video content data 132 based on the demographic, education level, family structure, socio-economic data, cultural heritage, scenery, environment, residence location, hobbies, interests, and/or other factors that may be used to present the content to the target user in a way that will stimulate an increased level of interest. For example, context prompts 120 may be generated to adjust the appearance, accents, behaviors, and/or mannerisms of characters appearing in the content, or present the content in a context of a cultural heritage, scenery, environment, location, hobby, activity, or interest associated with the target user by the user profile data 106. In some embodiments, context prompts 120 may be used to localize targeted video content data 132 to a locality of the user. Other context prompts 120 may adjust the content for other contexts based on the user profile data such as, but not limited to, different time periods, different cultural and/or social norms and/or historical events, styles, scenery, architecture, technology, languages, dialects, music, cultural references, and/or other sets of characteristics that define circumstances and/or features that form the setting for events, scenes, dialogue, actions, and other plot devices appearing in the video content. In some embodiments, the content prompt server 112 may receive current news, weather, or other data (e.g., from a content server 160) and correlated location data with such real-time information to produce context prompts 120 that incorporated the data into the targeted video content—for example, generating scenes reflecting current weather conditions in the vicinity of the user.

In some embodiments, the user context prompt server 112 may comprise one or more machine learning models that implement a context prompt generator model 114. In some embodiments, the context prompt generator model 114 may comprise a natural language processor (NLP)—such as a large language model (LLM)-based machine learning model—that is trained to generate prompts based on a natural language input received from the user profile data 106. For example, the context prompt generator model may predict or infer a selection of one or more context prompts 120 to feed the video generator model 130 to produce targeted video content data 132 within a context predicted and/or inferred to have a high level of affinity based on the user profile data 106. In some embodiments, the context prompts 120 may be in the form of human-readable data and/or may comprise prompts in the form of embeddings, vectors, or otherwise encoded prompts understandable to the video generator model 130. In some embodiments, the content prompt generator model 118 and the context prompt generator model 114 may be integrated together in a machine learning model prompt server that receives the user profile data 106 and content data 115 as inputs and produces a set of prompts to the video generator model 130 that includes prompts representing both context prompts 120 and content prompts 122.

The content prompts 122 and context prompts 120 may be used as inputs to a generative artificial intelligence (AI) video generator model 130 that outputs synthesized targeted video content data 132 that comprises video content directed at the objectives indicated by the content data 115, within a context adjusted to have high affinity to the target user.

The resulting targeted video content data 132 synthesized by the custom content generator 110 may be streamed to the content presentation client application 152 for presentation on the UE 150. More specifically, the custom content generator 110 may generate a streaming output from the API 140 that includes the targeted video content data 132. The content presentation client application 152 receives the streaming output and produces a rendering of the targeted video content data 132 on a display of the UE 150. It should be understood that the targeted video content data 132 may include a combination of a video channel with video data and one or more corresponding tracks of audio in audio channels. The targeted video content data 132 may be transmitted in a format for streaming video, which may be encoded in a streaming video format such as, but not limited to, High-Efficiency Video Coding (HEVC, H.265), Advanced Video Coding (AVC, H.264), AOMedia Video 1 (AV1), a Moving Picture Experts Group (MPEG) codec, or other format, protocol, and/or codec. Improvements and efficiencies are realized with respect to the underlying computing and network resources that implement the custom video content generator in terms of memory, in that more precisely targeted video content can be delivered without having to produce and maintain in memory various different versions of content, and the computing resources to deliver the content is more efficiently utilized as the content delivered is more likely to be noticed and consumed by the user.

As previously mentioned, while the custom content generator 110 may produce targeted video content data 132 that was not expressly solicited by the user, but instead initiated for marketing and/or advertising, in other embodiments, a custom content generator 110 may produce targeted video content data 132 for other purposes.

Figure 2:
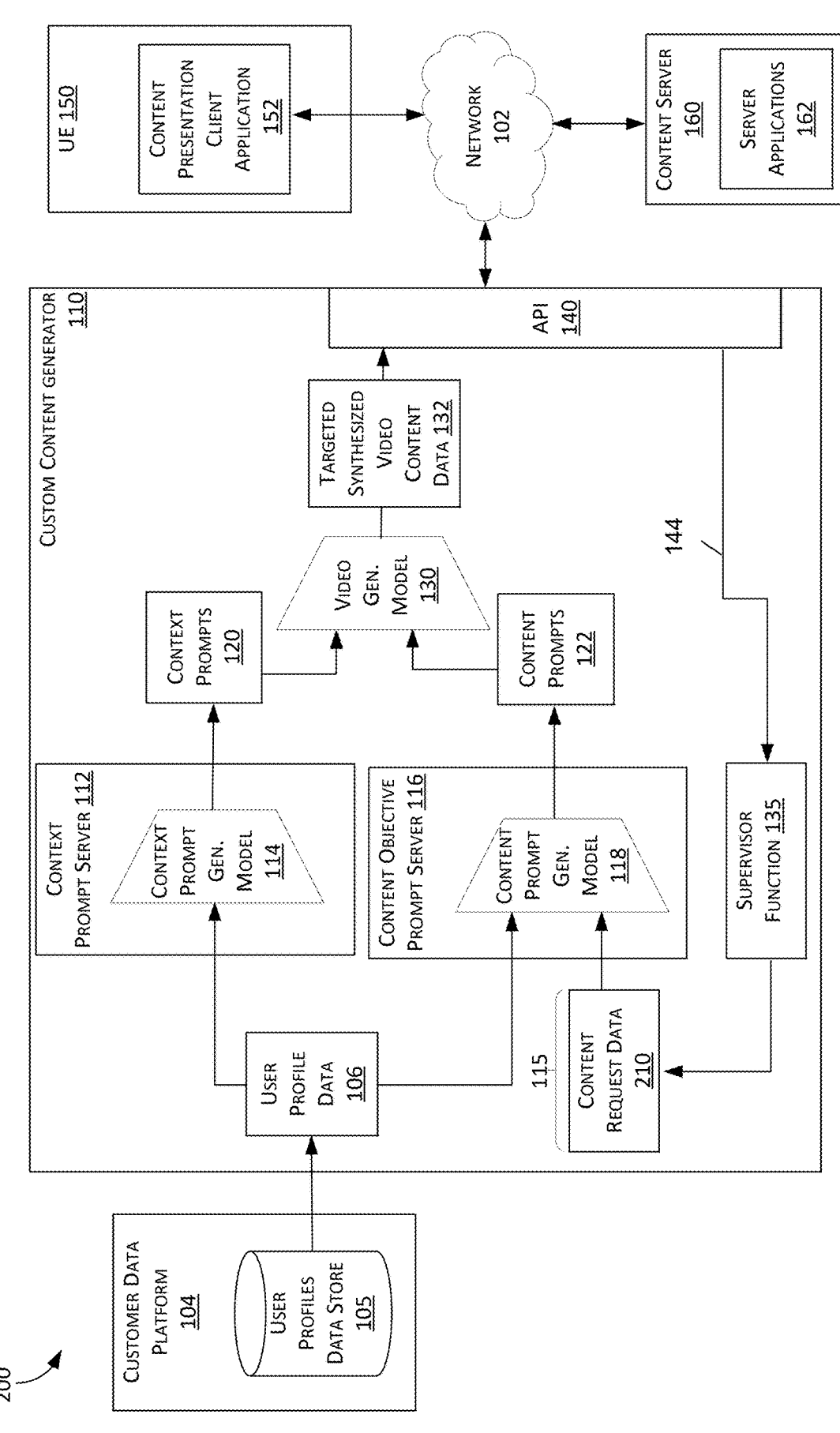
FIG. 2 is a diagram illustrating an example machine learning-based custom content generator system, in accordance with some embodiments described herein.

As previously mentioned, embodiments described herein are not limited to deliver advertising and/or marketing content. FIG. 2 is a diagram illustrating an example machine learning-based custom content generator system 200 comprising a custom content generator 110 that operates as discussed with respect to FIG. 1, but wherein the content data 115 may at least in part comprise content request data 210 so that the custom content generator 110 may produce synthetically generated user-requested content for delivery to the user. For example, in some embodiments, the content presentation client application 152 may transmit a content request to the custom content generator 110 based on a user input. The content request may be received by a request processor (e.g., a function of the supervisor function 135) that extracts content request data 210 from the content request that may be used as the content data 115 input to the content objective prompt server 116 for generating one or more of the content prompts 122. In a marketing use case, the content request data 210 may comprise a request for further information about a product the user is viewing from an online catalog, such as a request for features and/or specifications for the products, or installation/assembly instructions. In some embodiments, a custom content generator 110 may receive content data 115 that comprises a combination of content request data 210 from a user, and campaign data 109 such as discussed with respect to FIG. 1, to produce content prompts 122 directed at objectives indicated by a campaign profile 108 that are further directed to specific requests from the user of UE 150.

In some embodiments, the content request 144 may comprise a request for video content for entertainment purposes and may specify details such as plot elements, story lines, characters, scenes, and so forth, such that the video generator model 130 synthesizes targeted video content data 132 based on content prompts 122 derived from the user content request 144. The video generator model 130 may further synthesize the targeted video content data 132 based on context prompts 120 derived from user profile data 106, thereby increasing the likelihood that the user viewing the content will experience a high degree of affinity for the targeted video content synthesized by the custom content generator 110 in response to the content request 144. The video generator model 130 may be trained, for example, on annotated historic film, movies, and/or television content and learn characteristics of actors and film plots of different genres to generate temporally coherent frames of photorealistic video and accompanying audio given a relatively sparse content request from the user.

Figure 3:
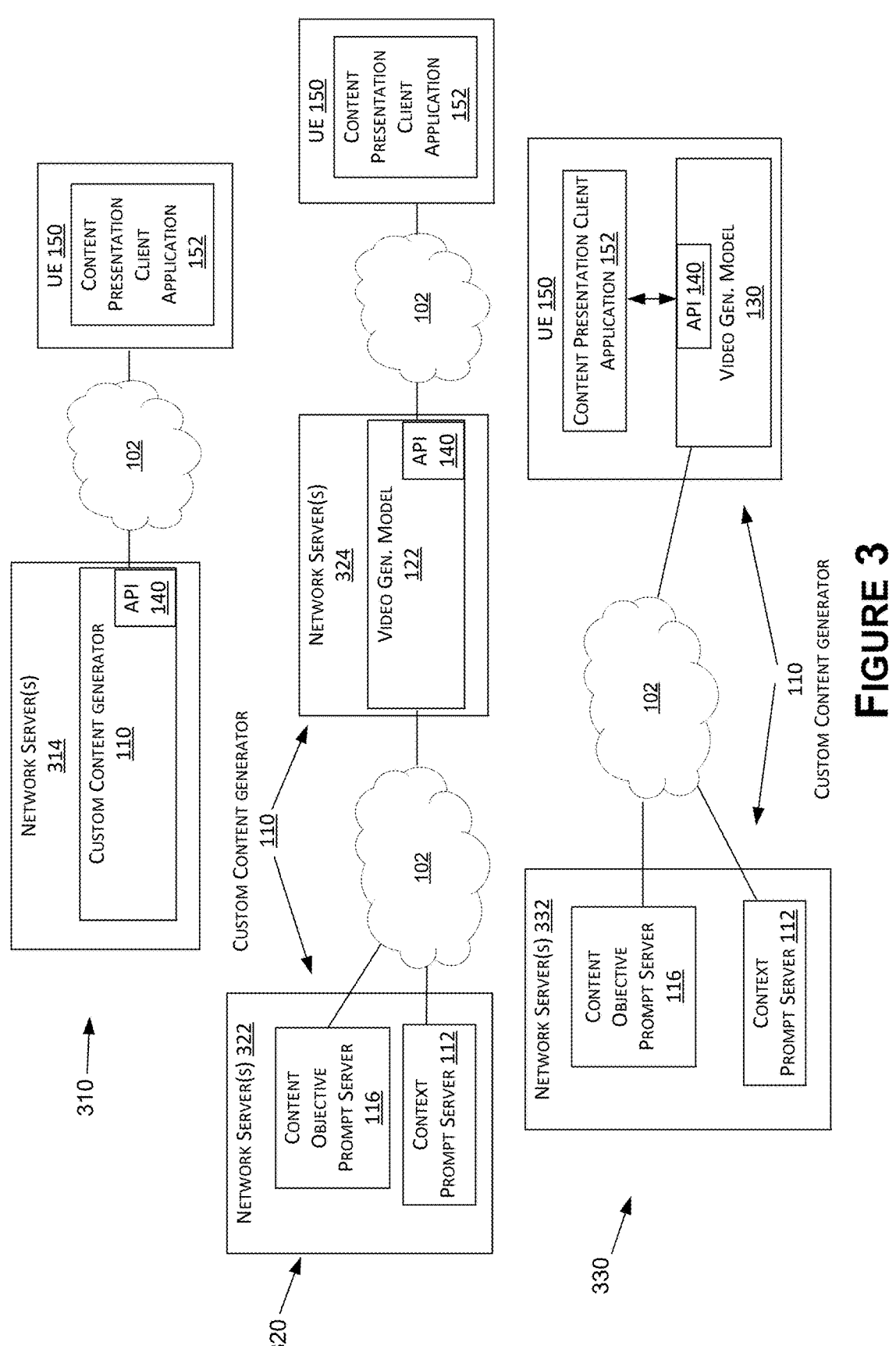
FIG. 3 is a diagram illustrating an example network configurations for an example machine learning-based custom content generator system, in accordance with some embodiments described herein.

FIG. 3 is a diagram illustrating example alternative configurations for custom content generator 110 in a network environment. In various embodiments, the elements of the custom content generator 110 as illustrated in FIG. 1 may be implemented together on a network-connected computing resource. In some embodiments, the elements of the custom content generator 110 may be distributed across a plurality of network nodes. For example, in some embodiments, as shown at 310, the custom content generator 110 may be hosted on one or more network server(s) 314 communicatively coupled to UE 150 by a network connection via one or more networks 102 (e.g., a local area network, wide area network, a wired or wireless telecommunications network, and/or the Internet). In some embodiments, as shown at 320, the custom content generator 110 may be distributed across multiple network servers, such as network server(s) 322 and 324 for example. In this example, one or both of the context prompt server 112 and content objective prompt server 116 may be executed on one or more first network server(s) 322, sending their respective prompts via network 102 to the video generator model 130 that is executed on second network server(s) 322 along with the API 140 providing access to the services of the custom content generator 110.

In some embodiments, such as shown at 330, the video generator model 130 of a custom content generator 110 may be an integrated function executed onboard the UE 150. In this configuration, the content presentation client application 152 communicates a content request 144 to the custom content generator 110 through an internal data channel of the UE 150, and the custom content generator 110 within the UE 150 communicates with one or more network server(s) 332 that host the prompt servers 112 and 116 to request content and context prompts for generating the targeted video content data 132. The prompts may be communicated to the video generator model 130 hosted on the UE 150 to generate the targeted video content data 132 locally and present the synthesized content on the content presentation client application 152. In still other embodiments, one or more of the functions of a custom content generator 110 may be distributed for implementation between various networked elements such as a content server, a middleware network server node, and/or a UE.

Figure 4:
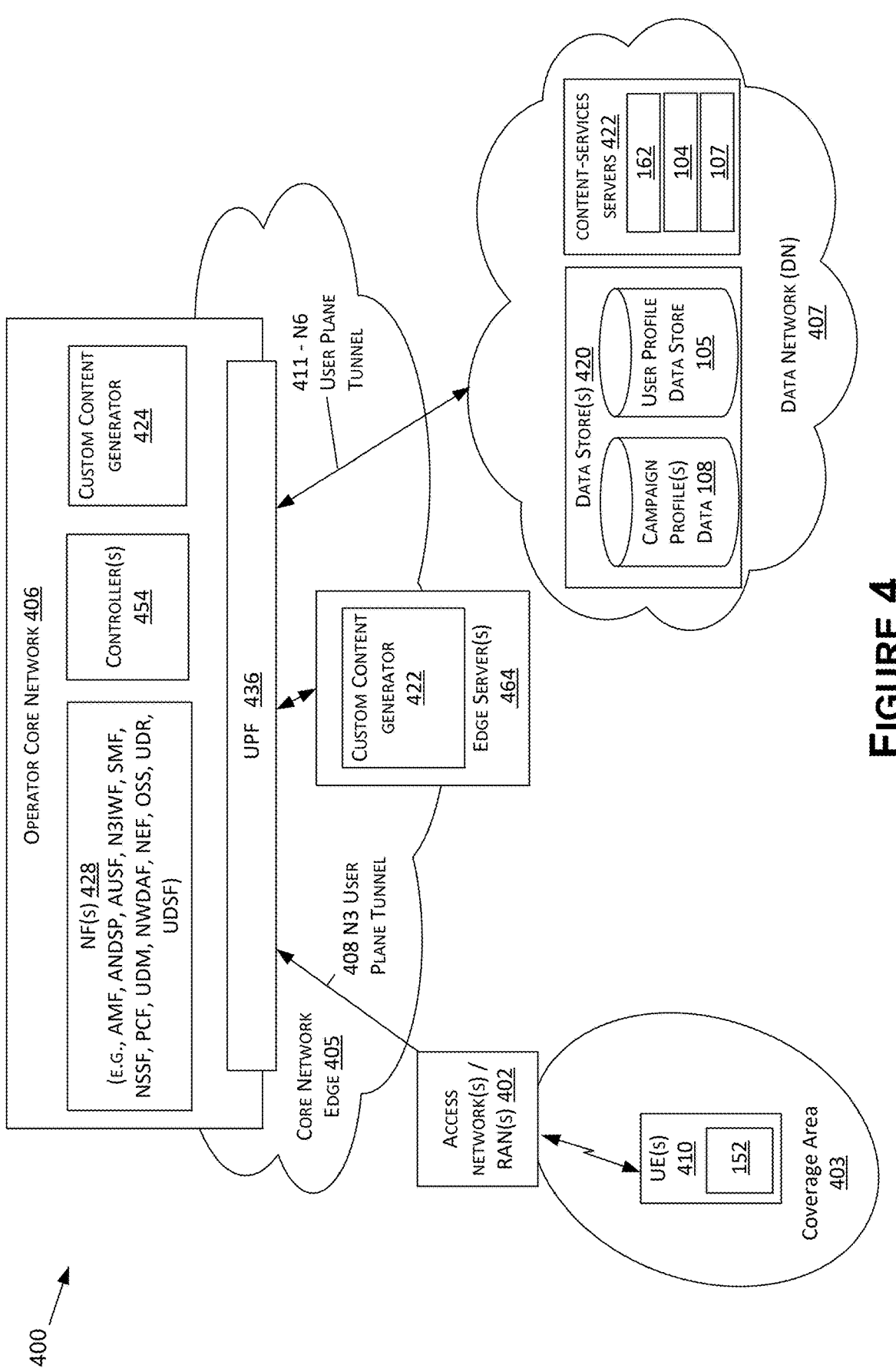
FIG. 4 is a diagram illustrating an example telecommunications network environment comprising a network function for providing machine learning-based custom content generation as a network service, in accordance with some embodiments described herein.

Referring now to FIG. 4, FIG. 4 is a diagram illustrating an example telecommunications network environment comprising a network function for providing machine learning-based custom content generation as a network service. FIG. 4 illustrates an example embodiment where the functions of a custom content generator 110 may be provided as a network service by at least one network function of a telecommunications network 400. For example, the at least one network function may perform one or more operations to generate one or more prompts, based on user profile data and an indication of content objectives, to produce targeted synthesized video content data 132 from a video generator model 130.

More specifically, FIG. 4 is a diagram illustrating an example network environment 400 embodiment for a wireless communication system 400 that provides targeted video content synthesis to network subscribers as a network service. Network environment 400 is but one example of a suitable telecommunications network and is not intended to suggest any limitation as to the scope of use or functionality of the embodiments disclosed herein, and nor should the network environment be interpreted as having any dependency or requirement relating to any one or combination of components illustrated.

As shown in FIG. 4, network environment 400 comprises an operator core network 406 (also referred to as a "core network") that provides one or more network services to one or more UEs 410 (which may include UE 150) via at least one access network 402, such as a radio access network (RAN) 402. In some embodiments, network environment 400 comprises, at least in part, a wireless communications network, such as, but not limited to, a 5G wireless communications network. In some embodiments, the network environment 400 comprises one or more RANs 402, which may be referred to in the context of a wireless telecommunications network as a wireless base station, cell site, or cellular base station. At least one RAN 402 may represent at least one wireless base station coupled to an operator core network to establish one or more communication links between the operator core network 406 and UE 410. Each RAN 402 may provide wireless connectivity access to one or more UEs 410 operating within a coverage area 403 associated with that RAN 402. The RAN 402 may implement wireless connectivity using, for example, 3rd Generation Partnership Project (3GPP) technologies. The RAN 402 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 402 may comprise, at least in part, components of a customer premises network, such as a distributed antenna system (DAS), for example. Radio access network(s) 402 may comprise a multimodal network (for example, comprising one or more multimodal access devices) where multiple radios supporting different systems are integrated into the radio access network(s) 402. Such a multimodal access network may support a combination of 3GPP radio technologies (e.g., 4G, 5G, and/or 6G) and/or non-3GPP radio technologies (e.g., Institute of Electrical and Electronics Engineers (IEEE) 802.11 (WiFi) and/or IEEE 802.15 (Bluetooth) access points). In some embodiments, the RAN 402 may comprise a terrestrial wireless communications base station and/or may be at least in part implemented as a space-based access network, such as a base station implemented by an Earth-orbiting satellite. Individual UE 410 may communicate with the operator core network 406 via the RAN 402 over one or both of uplink (UL) radio frequency (RF) signals and downlink (DL) radio frequency (RF) signals.

As shown in FIG. 4, RAN 402 may be coupled to the operator core network 406 via a core network edge 405 that comprises edge server nodes and wired and/or wireless network connections that may further include wireless relays and/or repeaters. In some embodiments, the RAN 402 may be coupled to the operator core network 406 at least in part by a backhaul network such as the Internet or other public or private network infrastructure. Core network edge 405 may comprise one or more network nodes (e.g., servers) or other elements of the operator core network 406 that may define the boundary of the operator core network 406 and may serve as the architectural demarcation point where the operator core network 406 connects to other networks such as, but not limited to, RAN 402, the Internet, a Data Network (DN) 407, and/or other third-party networks. In some embodiments, the network edge 405 may comprise one or more network nodes that include at least one edge server 464. One or more edge server(s) 464 may provide, for example, edge-based network function services to UEs 410 that may be accessed separately from services provided by network functions of the operator core network 406. For example, edge server(s) 464 may host databases, caches, microservices, ledgers, decentralized applications (e.g., DApps), and/or may perform data traffic monitoring, inspections, and/or aggregation for other network functions of the network environment 400.

It should be understood that in some aspects, the network environment 400 may not comprise a distinct operator core network 406, but rather may implement one or more features of the operator core network 406 within other portions of the network, or may not implement them at all, depending on various carrier preferences.

As shown in FIG. 4, network environment 400 may also comprise at least one data network (DN) 407 coupled to the operator core network 406 (e.g., via the network edge 405). Data network 407 may include one or more data stores 420 and/or one or more content-services servers 422 such that UE 410 may access services and/or content provided by the data store(s) 409 and/or server(s) 422 of DN 407. For example, in some embodiments, the DN 407 may comprise one or more servers 422 that hosts a content server application 162, a CDP 104, an advertising campaign data platform 107, and/or other servers, and/or a data store 420 that hosts user profiles data store 105 and/or campaign profiles data 108.

In some implementations, the operator core network 406 may comprise modules, also referred to as network functions (NFs), implemented by one or more processors and generally represented in FIG. 4 as NF(s) 428. Such network functions 428 may include one or more of, but not limited to, a core access and mobility management function (AMF), an access network discovery and selection policy (ANDSP), an authentication server function (AUSF), a user plane function (UPF), non-3GPP interworking function (N3IWF), a session management function (SMF), a network slice selection function (NSSF), a policy control function (PCF), a unified data management (UDM) function, a unified data repository (UDR), an unstructured data storage function (UDSF), a network data analytics function (NWDAF), a network exposure function (NEF), an operations support system (OSS), and/or other network functions. Implementation of these NFs 428 of the operator core network 406 may be executed by one or more controllers 454 on which these network functions are orchestrated or otherwise configured to execute utilizing processors and memory of the one or more controllers 454. The NFs may be implemented as physical and/or virtual network functions, container network functions, and/or cloud-native network functions, such as is described with respect to FIG. 7.

The user plane function (UPF), illustrated in FIG. 4 at 436, represents at least one function of the operator core network 406 that may extend into the core network edge 405. In some embodiments, the RAN 402 is coupled to the UPF 436 within the core network edge 405 by a communication link that includes an N3 user plane tunnel 408. For example, the N3 user plane tunnel 408 may connect a cell site router of the RAN 402 to an N3 interface of the UPF 436. The data store(s) 409, server(s) 422, and/or other elements of DN 407 may be coupled to the UPF 436 in the core network edge 405 by an N6 user plane tunnel 411. For example, the N6 user plane tunnel 411 may connect a network interface (e.g., a switch, router, and/or gateway) of the DN 407 to an N6 interface of the UPF 436. In some embodiments, the operator core network 406 may comprise a plurality of UPFs 436, such as a UPF at the operator core network 406 and a UPF at the core network edge 405. For example, a UPF at the core network edge 405 may be used for local breakout and/or low-latency types of applications via an N9 interface between the distinct UPFs.

In some embodiments, one or more aspects of a custom content generator as discussed herein (such as custom content generator 110) may be implemented using one or more of the network functions 428 and provided to UE 410 as a network service offered from the operator core network 406 (shown as the network core-hosted custom content generator 424 network function) and/or edge server 464 (shown as the network edge-hosted custom content generator 422 network function).

In operation, a custom content generator provided as a network function service of the operator core network 406 and/or edge server 464 may operate in the same manner as any of the custom content generators described herein.

For example, a content presentation client application 152 of a UE 410 may initiate a session with one or more of the server applications 162 hosted by content-services servers 422. UE 410 and/or server applications 162 may access a custom content generator network function by sending a content request to an application programming interface (API) of the custom content generator network function. The content request may be received by a supervisory function that extracts a target ID linked to the user of UE 410. For example, the target ID may be based on tracking cookies, pixels, device IDs, and/or other non-personally identifiable information, or other identifiers.

Based on the target ID, the custom content generator network function may request user profile data 106 (associated with the user of UE 150) from one or more sources such as, but not limited to, a consumer data platform (CDP) 104. In some embodiments, based on the user profile data 106, the custom content generator 110 may communicate with the advertising campaign data platform 107 to request content data. In this use case, the content data may comprise campaign data. In some embodiments, the content data may at least in part comprise content request data so that the custom content generator may produce synthetically generated user-requested content. The custom content generator network function may then generate and transport targeted video content data 132 back to the access network 402 for delivery to the UE 410 for presentation. In some embodiments, the PCF of the operator core network 406 maintains subscription information indicating one or more services and/or microservices subscribed to by each UE 410, including the context customization network service provided by the custom content generator network function.

FIG. 5 is a flow chart illustrating a method 500 for custom content generation of video content, according to some embodiments. It should be understood that the features and elements described herein with respect to the method of FIG. 5 may be used in conjunction with, in combination with, or substituted for elements of any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 are implemented utilizing one or more processing units, such as the controller of an operator core network, a network node, a networked server, an edge server, a RAN, user equipment (UE), a computing device, a cloud computing environment, and/or other processing units or computing devices as disclosed in any of the embodiments herein. In some embodiments, the method 500 may be implemented by components of a telecommunications network environment 400, such as illustrated by FIG. 4. In some embodiments, the method 500 may be performed at least in part by a machine learning-based custom content generator system and/or custom content generator, such as discussed with respect to any of the figures herein.

The method 500, at B510, includes generating one or more content generation prompts for input to a video generator model based at least on one or more video content objectives and user profile data, wherein the user profile data represents one or more characteristics of a user defining a target of the one or more video content objectives. For example, in some embodiments, user profile data may be received at a custom content generator 110 that represents one or more characteristics of a user. User profile data may comprise an amalgamation of user interactions with websites (pages visited, items clicked, time spent on a page); user interactions within a mobile application (e.g., executed on a smart device such as a smartphone and/or tablet computer), such as app usage, features used, and in-app purchases; data from relationship management systems, which include customer contact details, purchase history, and customer service interactions; interactions on social media platforms, such as likes, shares, comments, and direct messages; purchase data and other transactional information; information submitted through web forms, such as sign-up forms and contact forms; data from email interactions, such as click-through rates and responses; and/or data purchased from third-party sources. User profile data may thus include one or more of, but is not limited to, demographic information (e.g., age, gender, and/or race), socioeconomic information, level of education, political affiliations, geographic location, interests, online behavior, and/or other data. User profile data may be received from one or more resources such as, but not limited to, a consumer data platform, which may also be referred to as a customer data platform and/or a customer experience platform. Content objectives may be represented by content data, such as campaign data 109 and/or content request data 210 described herein, for example. That is, the indication of video content objectives may comprise a representation of advertising campaign data and/or a representation of a user content request from a user equipment client application. In some embodiments, a custom content generator may include one or more prompt servers that generate prompts for input to the video generator model such as described above with respect to FIGS. 1 and 2. For example, the custom content generator may comprise a context prompt server to generate context prompts for input to the video generator model (e.g., based on the user profile data), and may comprise a content objective prompt server to generate content prompts to the prompt server (e.g., based on the objectives indicated by the content data and/or the user profile data). In some embodiments, the context prompt server and content objective prompt server may be integrated into a common prompt server that generates both content and context prompts based on the user profile data and the one or more video content objectives (e.g., as represented by content data).

The method 500 at B512 includes generating targeted video data based on applying the one or more content generation prompts to a video generator model. The context prompt generator model may predict or infer a selection of one or more prompts to feed the video generator model to produce targeted video content data within a context predicted and/or inferred to have a high level of affinity based on the user profile data. In some embodiments, the context prompts may be in the form of human-readable data and/or may comprise prompts in the form of embeddings, vectors, or otherwise encoded prompts understandable to the video generator model. In some embodiments, the content and context prompts may be used as inputs to a generative artificial intelligence (AI) video generator model that outputs synthesized targeted video content data that comprises video content directed at the objectives indicated by the content data, within a context adjusted to have high affinity to the target user. The video generator model may comprise a generative artificial intelligence (GAI)-based machine learning model implemented using, for example, a deep neural network (DNN), Generative Adversarial Networks (GANs), a variational autoencoder (VAE), and/or other GAI machine learning model architecture. The video generator model may be trained on annotated video to generate temporally coherent frames of photorealistic video and corresponding audio. In some embodiments, the video generator model 130 may be trained using video content (which may include video and audio data channels), and/or segments thereof, annotated with contextual indicators (e.g., to train the video generator model 130 on features and content elements that characterize a particular context). The resulting targeted video content data may be delivered back to a UE for presentation.

The method 500 at B514 includes transmitting the targeted video data to a user equipment client application to cause the user equipment client application to present video content based on the targeted video data. For example, the method may include streaming the targeted video data to a user equipment client application to cause the user equipment client application to present video content based on the targeted video data. In some embodiments, the customized video content data may be delivered back to the UE for presentation by a content presentation client application. The customized video content data may be transmitted as a real-time streaming output in a format for streaming video, which may be encoded in a format such as, but not limited to, High-Efficiency Video Coding (HEVC, H.265), Advanced Video Coding (AVC, H.264), AOMedia Video 1 (AV1), a Moving Picture Experts Group (MPEG) codec, or other format, protocol, and/or codec.

Figure 6:
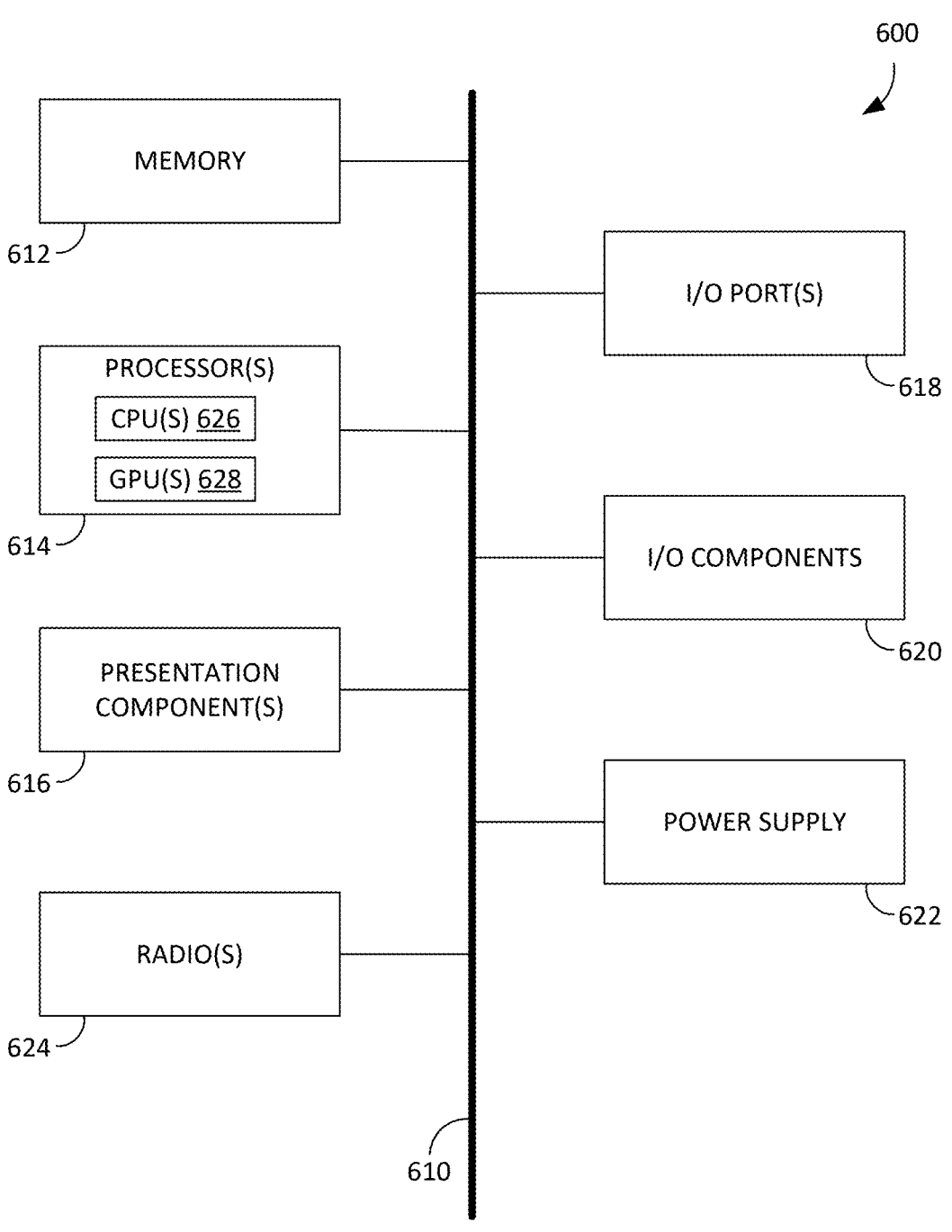
FIG. 6 is an example computing device, in accordance with some embodiments described herein.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein, and nor should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, power supply 622, and radio 624. Bus 610 represents what may be one or more buses (such as an address bus, data bus, or combination thereof). The devices of FIG. 6 are shown with lines for the sake of clarity. However, it should be understood that the functions performed by one or more components of the computing device 600 may be combined or distributed amongst the various components. For example, a presentation component such as a display device may be one of I/O components 620. In some embodiments, one or more functions of a custom content generator discussed herein (e.g., custom content generator 110, context prompt server 112, and/or content objective prompt server 116) may be executed at least in part by computing device 600. The processors 614 of computing device 600 may include a memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," "smart television," etc., as all are contemplated within the scope of FIG. 6 and refer to "computer" or "computing device."

Computing device 600 typically includes a variety of computer-readable media storing computer-usable instructions. For example, applications, algorithms, and/or neural networks for executing a custom content generator may be stored in a memory comprising such computer-readable media. Computer-readable media can be any available media that can be accessed by computing device 600 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient random-access memory (RAM), read-only memory (ROM), electrically erasable programmable read-only memory (EE-PROM), flash memory or other memory technology, compact disk (CD)-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer-readable media.

Memory 612 includes computer storage media in the form of volatile and/or non-volatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Processors 614 may include one or more central processing units (CPUs) 626 and/or one or more graphics processing units (GPUs) 628. In some embodiments, one or more functions of the custom content generator 110 may be executed by the processors 64. In some embodiments, video generator model 130, context prompt generator model 114, content prompt generator model 118, and/or other machine learning models discussed herein may be executed on one or more neural networks implemented on the one or more GPUs 628. One or more presentation components 616 present data indications to a person or other device. Exemplary one or more presentation components 66 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc. In some embodiments, the I/O components 620 may include a network interface card (NIC) for coupling a custom content generator to a network, such as described herein.

Radio(s) 624 represents a radio that facilitates communication with a wireless telecommunications network. For example, radio(s) 624 may be used to establish communications with components of a network 102, a RAN 402, operator core network 406, and/or core network edge 405. Illustrative wireless telecommunications technologies include code-division multiple access (CDMA), general packet radio service (GPRS), time division multiple access (TDMA), global system for mobile communications (GSM), and the like. Radio(s) 624 may additionally or alternatively facilitate other types of wireless communications including Wi-Fi, WiMAX, LTE, and/or other voice-over-internet protocol (VOIP) communications. In some embodiments, radio(s) 624 may support multimodal connections that include a combination of 3GPP radio technologies (e.g., 4G, 5G, and/or 6G) and/or non-3GPP radio technologies. As can be appreciated, in various embodiments, radio(s) 624 can be configured to support multiple technologies, and/or multiple radios can be utilized to support multiple technologies. In some embodiments, the radio(s) 624 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
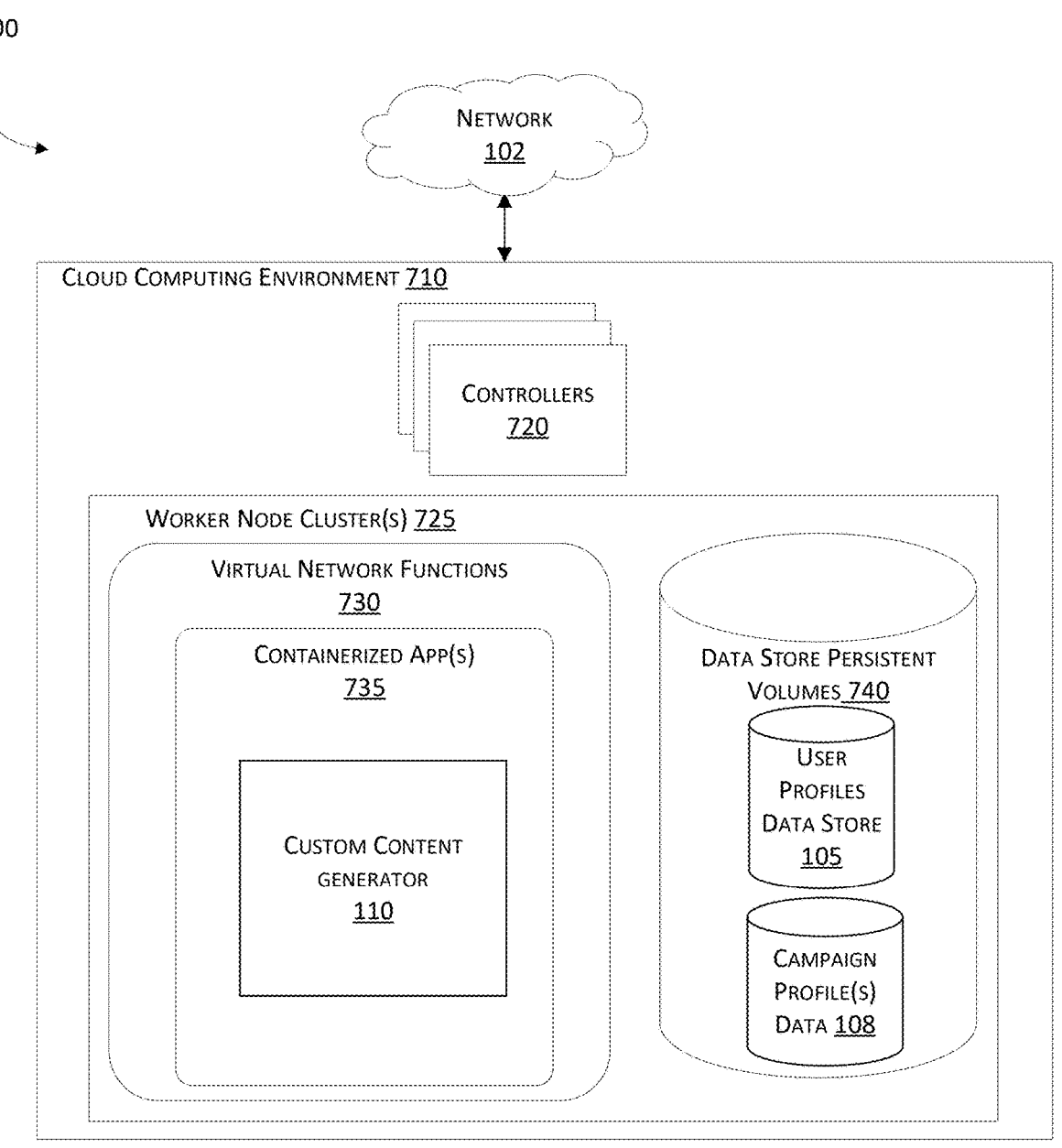
FIG. 7 is an example cloud computing platform, in accordance with some embodiments described herein.

Referring to FIG. 7, a diagram is depicted generally at 700 of an exemplary cloud computing environment 710 for implementing one or more aspects of a custom content generator, as implemented by the systems and methods described herein. Cloud computing environment 710 is but one example of a suitable cloud computing environment and is not intended to suggest any limitation as to the scope of use or functionality of the embodiments presented herein, and nor should cloud computing environment 710 be interpreted as having any dependency or requirement relating to any one or combination of components illustrated. In some embodiments, the cloud computing environment 710 is coupled to network 102 and/or may be executed within operator core network 406, the core network edge 405, edge server 464, or otherwise coupled to the core network edge 405 or operator core network 406.

Cloud computing environment 710 includes one or more controllers 720 comprising one or more processors and memory. The controllers 720 may comprise servers of a data center. In some embodiments, the controllers 720 are programmed to execute code to implement at least one or more aspects of a custom content generator as described herein. For example, in one embodiment a network function for a custom content generator 110 as discussed herein may be implemented as one or more virtual network functions (VNFs) 730 (which may include one or more container network functions (CNFs) running on a worker node cluster 725 established by the controllers 720.

The cluster of worker nodes 725 may include one or more orchestrated Kubernetes (K8s) pods that realize one or more containerized applications 735. In other embodiments, another orchestration system may be used. For example, the worker nodes 725 may use lightweight Kubernetes (K3s) pods, Docker Swarm instances, and/or other orchestration tools. In some embodiments, one or more elements of the machine learning-based custom content generator system 100, including one or more custom content generators 110 may be implemented by, or coupled to, the controllers 720 of the cloud computing environment 710 by network 102, operator core network 406, and/or core network edge 405. In some embodiments, one or more elements of a user profile's data store 105 and/or campaign profile(s) data 108 may be implemented at least in part using one or more data store persistent volumes 740 in the cloud computing environment 710.

In various alternative embodiments, system and/or device elements, method steps, or example implementations described throughout this disclosure (such as the UE, network nodes, servers, access networks, core network edge, operator core network, network functions, content customization generator, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize the elements and/or processes, said code stored on a non-transient hardware data storage device. Therefore, other embodiments of the present disclosure may include elements comprising program instructions resident on computer-readable media that when implemented by such computer systems enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High-Speed Integrated Circuit (VHSIC) Hardware Description Language (VHDL).

As used herein, the terms "network function," "engine," "generator," "processor," "controller," "unit," "model," "server," "node," and "module" are used to describe computer processing components and/or one or more computer-executable services being executed on one or more computer processing components. In the context of this disclosure, such terms used in this manner would be understood by one skilled in the art to refer to specific network elements and are not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for contextual customization of video content, the system comprising:
    one or more processors; and
    one or more computer-readable media storing computer-usable instructions that, when executed by the one or more processors, cause the one or more processors to:
        receive user profile data representing one or more characteristics of a user;
        receive a set of content data comprising an indication of one or more video content objectives;
        execute a context prompt server comprising a context prompt generator model configured to input at least the user profile data and the set of content data to generate one or more content generation prompts for a video generator model based at least on the user profile data and the set of content data, wherein the context prompt generator model infers one or more context prompts based on the user profile data, wherein the one or more content generation prompts includes the one or more context prompts, and apply the one or more content generation prompts to the video generator model to generate targeted video content data; and
        transmit the targeted video content data to a user equipment client application to cause the user equipment client application to present video content based on the targeted video content data.

2. The system of claim 1, the one or more processors further to:

stream the targeted video content data to the user equipment client application using a streaming video format.

3. The system of claim 1, the one or more processors further to:

generate the one or more content generation prompts to include a set of one or more content prompts representing the one or more video content objectives based at least on the set of content data; and generate the one or more content generation prompts to further include a set of one or more context prompts based at least on the user profile data, wherein the set of one or more context prompts define a set of features that form a setting to place the one or more video content objectives of the set of one or more content prompts within a context.

4. The system of claim 3, wherein the set of one or more context prompts represents a set of characteristics that defines one or more features that form a setting for at least one of events, scenes, dialogue, action, or plot devices associated with the targeted video content data.

5. The system of claim 3, wherein the set of one or more content prompts are further generated based on the user profile data.

6. The system of claim 1, wherein the video generator model comprises at least one of: a machine learning model, a generative artificial intelligence (GAI)-based machine learning model, a deep neural network (DNN), a generative adversarial network (GAN), or a variational autoencoder (VAE).

7. The system of claim 1, wherein the one or more processors to receive a request for streaming video content via a network connection from user equipment (UE) comprising the user equipment client application, wherein the set of content data is based at least in part on the request for streaming video content.

8. The system of claim 1, wherein the set of content data at least in part comprises campaign data received via a network from an advertising data campaign platform.

9. The system of claim 1, the one or more processors further to receive the user profile data via a network based on data from at least one of: a consumer data platform, a customer data platform, a customer experience platform, a relationship management system, user interactions with one or more websites, and interactions within a mobile application.

10. The system of claim 1, the one or more processors further to query a network server for the user profile data based on a target identifier associated with the user of the user equipment client application.

11. The system of claim 1, the one or more processors further to query a network server for the set of content data based at least in part on the user profile data.

12. The system of claim 1, the one or more processors further to execute a content prompt server comprising a content prompt generator model configured to input at least one of the user profile data and the set of content data, wherein the content prompt generator model infers one or more content prompts based on the at least one of the user profile data and the set of content data, wherein the one or more content generation prompts includes the one or more content prompts.

13. A telecommunications network, the network comprising:

an operator core network;

at least one edge server coupled to a core network edge of the operator core network;

at least one radio access network coupled to the operator core network, wherein the at least one radio access network establishes one or more communication links between the operator core network and one or more user equipment (UE); and at least one network function executed on one or more processors configured to perform one or more operations to:

generate one or more content generation prompts for input to a video generator model based on a set of content data comprising an indication of one or more video content objectives, and user profile data representing one or more characteristics of a user defining a target of the one or more video content objectives, wherein the one or more content generation prompts include a set of one or more content prompts representing the one or more video content objectives based at least on the set of content data, and include a set of one or more context prompts based at least on the user profile data, wherein the set of one or more context prompts define a set of features that form a setting to place the one or more video content objectives of the set of one or more content prompts within a context;

generate targeted video content data based on applying the one or more content generation prompts to the video generator model; and stream the targeted video content data via the at least one radio access network to a user equipment client application to cause the user equipment client application to present video content based on the targeted video content data.

14. The network of claim 13, wherein the at least one network function comprises a custom content generator executed by the one or more processors on the at least one edge server, wherein the custom content generator comprises the video generator model.

15. The network of claim 13, wherein the one or more processors comprise one or more controllers of a cloud computing environment, wherein the at least one network function comprises a custom content generator executing on a worker node cluster established by the one or more controllers, wherein the custom content generator comprises the video generator model.

16. A method comprising:

generating one or more content generation prompts for input to a video generator model based at least on one or more video content objectives and user profile data, wherein the user profile data represents one or more characteristics of a user defining a target of the one or more video content objectives, the one or more content generation prompts including a set of one or more content prompts representing the one or more video content objectives based at least on the one or more video content objectives, and including a set of one or more context prompts based at least on the user profile data, wherein the set of one or more context prompts define a set of features that form a setting to place the one or more video content objectives of the set of one or more content prompts within a context;

generating targeted video content data based on applying the one or more content generation prompts to the video generator model; and transmitting the targeted video content data to a user equipment client application to cause the user equipment client application to present video content based on the targeted video content data.

17. The method of claim 16, wherein the set of one or more context prompts represents a set of characteristics that defines one or more features that form a setting for at least one of events, scenes, dialogue, action, or plot devices associated with the targeted video content data.

\* \* \* \* \*